(12) United States Patent  (10) Patent No.: US 9,021,242 B2
Chiu  (45) Date of Patent: Apr. 28, 2015

(54) BOOT DETERMINING METHOD OF ELECTRONIC DEVICE HAVING ONE OR MORE STORAGE DISKS IN A LOW TEMPERATURE ENVIRONMENT

(75) Inventor: Chia-Chang Chiu, New Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 450 days.

(21) Appl. No.: 13/366,195

(22) Filed: Feb. 3, 2012

(65) Prior Publication Data

US 2012/0216026 A1    Aug. 23, 2012

Related U.S. Application Data

(60) Provisional application No. 61/444,103, filed on Feb. 17, 2011.

(30) Foreign Application Priority Data

Aug. 16, 2011    (CN) .......................... 2011 1 0233377

(51) Int. Cl.
   *G06F 9/00*    (2006.01)
   *G08B 21/00*   (2006.01)
   *G06F 1/26*    (2006.01)
   *G06F 1/20*    (2006.01)
   *G06F 9/44*    (2006.01)

(52) U.S. Cl.
   CPC .............. *G06F 1/206* (2013.01); *G06F 9/4401* (2013.01)

(58) Field of Classification Search
   CPC ....................................................... G06F 1/206

USPC ............................................................. 713/2
See application file for complete search history.

(56) References Cited

U.S. PATENT DOCUMENTS

| 6,169,930 | B1 * | 1/2001 | Blachek et al. ................. 700/79 |
| 6,735,035 | B1 * | 5/2004 | Smith et al. .................... 360/69 |
| 2004/0228023 | A1 * | 11/2004 | Keller et al. ................... 360/69 |
| 2007/0070539 | A1 * | 3/2007 | Lee et al. .................... 360/73.03 |
| 2008/0294295 | A1 * | 11/2008 | Chiu ............................ 700/299 |
| 2010/0070745 | A1 * | 3/2010 | Chiu ................................ 713/2 |
| 2011/0296155 | A1 * | 12/2011 | Belady et al. ..................... 713/2 |
| 2012/0005469 | A1 * | 1/2012 | Jeng et al. ........................ 713/2 |
| 2012/0011395 | A1 * | 1/2012 | Chou et al. ................... 714/6.13 |

FOREIGN PATENT DOCUMENTS

| DE | 102009044509 A1 | 5/2011 |
| TW | 200609695 A | 3/2006 |

* cited by examiner

*Primary Examiner* — Thomas Lee
*Assistant Examiner* — Robert Cassity

(57) ABSTRACT

A boot determining method of an electronic device is used to determine whether to boot the electronic device having at least one storage. The boot determining method includes: receiving a start signal; detecting an ambient temperature; detecting whether the at least one storage has a heating module; comparing the ambient temperature with a temperature threshold; reading storage information; determining type(s) of the at least one storage according to the storage information; and determining whether to boot the electronic device after receiving the starting signal, according to a determining condition. The determining condition includes the type(s) of the at least one storage; whether the environment temperature is lower than the temperature threshold; and whether each of the at least one-storage has the heating module.

9 Claims, 4 Drawing Sheets

BOOT DETERMINING METHOD OF ELECTRONIC DEVICE HAVING ONE OR MORE STORAGE DISKS IN A LOW TEMPERATURE ENVIRONMENT

BACKGROUND

1. Technical Field

The disclosure relates to a boot determining method of an electronic device for booting and electronic device thereof, and in particular, to a boot determining method capable of safely booting the electronic device in a low-temperature environment and the electronic device thereof.

2. Related Art

Conventional hard disks adopt a ball bearing system, in which multiple steel balls are placed at a spindle of a hard disk and a base. The balls contact the center of a bearing, and are used for supporting an operation motor. When the motor rotates, problems of friction and collision between the spindle of the hard disk and a base may occur. After frequent friction and collision, abrasion of the balls would be caused. Therefore, shock resistance of the conventional hard disk is lowered and service life of the conventional hard disk is shortened. In order to improve the above-mentioned problems, a Fluid Dynamic Bearing (FDB) technology has been developed.

The FDB has a viscous liquid film. The friction, collision and abrasion problems of the steel balls may be improved by the viscous liquid. At room temperature, the viscous liquid film can effectively absorb shocks, so the FDB hard disk has better shock resistance, longer service life, and more-improved reliability.

However, when the ambient temperature is below zero degrees Celsius, the liquid film of the FDB may be changed into a solid phase, and results in abnormal operations of the FDB and the FDB hard disk.

In order to enable the FDB hard disk to work normally under harsh environments (for example, the regions with low temperature), a component with the FDB hard disk and a heating module has been developed. The heating module is disposed on the FDB hard disk and is used to heat the FDB hard disk. The heating module may preheat the FDB hard disk to change the film of the FDB hard disk into a liquid phase before the FDB hard disk operates.

However, not all electronic devices are equipped with the heating module. A user may not know whether the electronic device is equipped with the heating module. For example, an electronic device includes a removable hard disk, and the user can remove and replace the hard disk at will. However, the user using the above-mentioned electronic device may not know the type of the replaced hard disk and whether the hard disk is equipped with the heating module.

In a low-temperature environment, if the electronic device is started and the FDB hard disk without the heating module is booted at the same time, the electronic device may fail to recognize or read the FDB hard disk without heating module. Moreover, the film of the FDB is solidified at low temperature, and the FDB may be damaged due to the operation of the FDB hard disk without heating module.

SUMMARY

An embodiment of the present invention discloses a boot determining method of the electronic device which is used to determine whether to boot the electronic device having at least one storage. The boot determining method of the electronic device comprises receiving a start signal; detecting an ambient temperature; detecting whether the at least one storage has a heating module; comparing the ambient temperature with a temperature threshold; reading storage information; determining type(s) of the least one storage according to the storage information; and determining whether to boot the electronic device according to a determining condition. The determining condition comprises the type(s) of the at least one storage, whether the ambient temperature is lower than the temperature threshold and whether each of the at least one storage has the heating module.

Another embodiment of the present invention discloses the electronic device which is capable of automatically determining whether to be booted. The electronic device comprises: at least one storage; a receiving module, for receiving a start signal; a temperature detection module, for detecting an ambient temperature; a detection module, electrically coupled to the at least one storage, for detecting whether the at least one storage has a heating module; a comparison module, for comparing the ambient temperature with a temperature threshold; a reading module, for reading storage information about type(s) of the storage; a storage determination module, for detecting and determining the type(s) of the at least one storage according to the storage information; and a boot determination module, electrically coupled to the receiving module, the storage determination module, the comparison module and the detection module. After receiving the start signal from the receiving module, the boot determination module determines whether to boot the electronic device according to a determining condition. The determining condition comprises determining whether to boot the electronic device according to the type(s) of the at least one storage, whether the ambient temperature is lower than the temperature threshold and whether the at least one storage has the heating module.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

The detailed features and advantages of the disclosure are described below in great detail through the following embodiments, the content of the detailed description is sufficient for those skilled in the art to understand the technical content of the present disclosure and to implement the disclosure there accordingly. Based upon the content of the specification, the claims, and the drawings, those skilled in the art can easily understand the relevant objectives and advantages of the disclosure.

This embodiment discloses a boot determining method of the electronic device, which is used to safely boot the electronic device in a low-temperature (i.e. below zero degrees Celsius) environment. The electronic device may be a desktop computer, a notebook computer, a tablet computer or a handheld computer. Additionally, "boot" refers to enabling the electronic device to enter a normal working mode from a sleep mode, a standby mode, a low-power operation mode or a shutdown mode. In this embodiment, the electronic device is a notebook computer, and "boot" refers that the electronic device goes into a G0/S0 state from any one of states S1, S2, S3 and S4 of an Advanced Configuration and Power Interface (ACPI).

Figure 1:
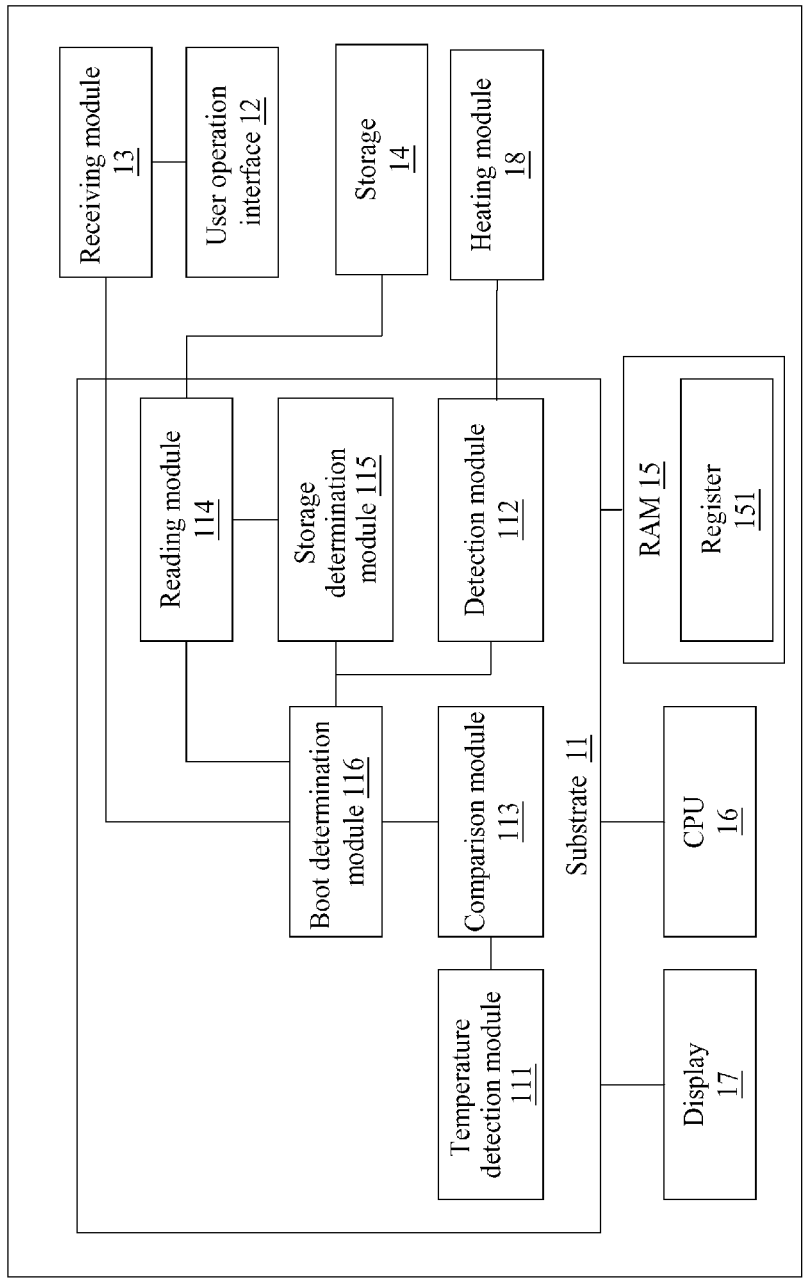
FIG. 1 is an architectural view of the electronic device according to an embodiment.

FIG. 1 is an architectural view of the electronic device according to an embodiment. Referring to FIG. 1, the electronic device 10 comprises hardware modules such as a substrate 11, a user operation interface 12, a receiving module 13, a storage 14, a random access memory (RAM) 15, a central processor unit (CPU) 16 and a display 17. The above-mentioned hardware modules of the electronic device 10 are not limited to the present invention. The substrate 11 comprises a temperature detection module 111, a detection module 112, a comparison module 113, a reading module 114, a storage determination module 115, and a boot determination module 116. The electronic device 10 implements the boot determining method of the electronic device 10 through the above-mentioned modules.

The receiving module 13 is electrically coupled to the user operation interface 12. The reading module 114 is electrically coupled to the storage 14 and the storage determination module 115. The temperature detection module 111 is electrically coupled to the comparison module 113. The boot determination module 116 is electrically coupled to the detection module 112, the comparison module 113, the reading module 114 and the storage determination module 115, respectively. The reading module 114, the storage determination module 115 and the boot determination module 116 may be integrated into a basic input/output system (BIOS) of the electronic device 10.

The electronic device 10 comprises a removable hard disk. Preferably, the electronic device 10 is an industrial standard computer or a military standard computer, for example, Getac Technology Corp. products: B300, B300x or E100.

The storage 14 of the electronic device 10 may be a non-removable hard disk or a removable hard disk built in the electronic device 10.

The storage 14 may be an FDB hard disk, or a solid state disk (also referred to as electronic hard disk). The solid state disk is a storage device based on a non-volatile memory (for example, flash memory) or a volatile memory (for example, Synchronous Dynamic Random Access Memory, SDRAM).

Substantially, when the temperature is higher than minus 20 degrees Celsius, both of the solid state disks and the FDB hard disks having the heating module 18 can be booted normally. But when the temperature is below zero degrees Celsius, the film of the FDB is solidified, and the FDB may be damaged due to the operation of the FDB hard disks without the heating module 18. Additionally, a connection bus interface of the storage 14 may be a serial advanced technology attachment (SATA) interface, or a peripheral component interconnect Express (PCI Express, also referred to as PCI-E)-to-SATA interface.

The user can enable or disable the hard disk low-temperature protection function (that is, the boot determining method of the electronic device of the present prevention) under a user menu of the electronic device 10.

The implementation method for another hard disk low-temperature protection function is described as follows: If the user menu does not have the option of the hard disk low-temperature protection function, a flag for representing whether to enable the hard disk low-temperature protection function may be set in an Electrically-Erasable Programmable Read-Only Memory (EEPROM). The EEPROM is electrically coupled to a keyboard controller (KBC) of the substrate 11, and then the user sets the value of the flag through an application program. If the hard disk low-temperature protection function is enabled, the electronic device 10 executes the following boot determining method. If the hard disk low-temperature protection function is disabled, the electronic device 10 can be directly started, even in a low-temperature environment.

Figure 2:
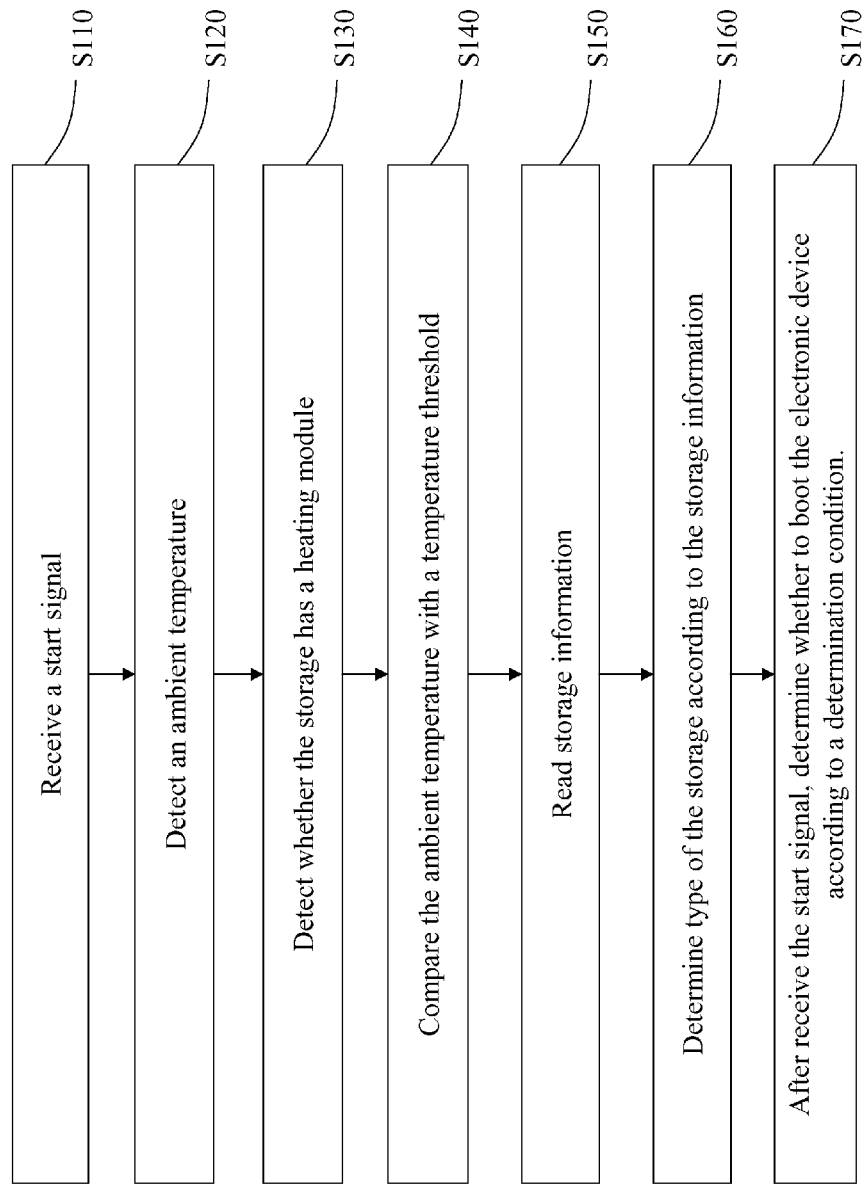
FIG. 2 is a flow chart of a boot determining method of the electronic device according to an embodiment.

FIG. 2 is a flow chart of a boot determining method of the electronic device according to an embodiment.

Referring to FIG. 2, when the user boots the electronic device 10 by pressing the user operation interface 12 of the electronic device 10, the receiving module 13 receives a start signal from the user operation interface 12 (Step S110). In this state, only the KBC is in an active state, so the temperature detection module 111 and the detection module 112 may both be implemented through the KBC. The KBC turns on power supplies of the modules on the substrate 11 of the electronic device 10 in sequence, to execute a power on self test (POST). Meanwhile, the temperature detection module 111 detects an ambient temperature (Step S120). In this embodiment, the temperature detection module 111 may be a thermal sensor which is disposed on the substrate 11. In order to detect the ambient temperature, the KBC reads the thermal sensor through an inter integrated circuits bus ($I^2C$ bus).

Next, the detection module 112 detects whether the storage 14 has a heating module 18 (Step S130). More particularly, after a power supply of the thermal sensor on the substrate 11 is turned on, the KBC reads a value of the thermal senor through an $I^2C$ bus in order to detect the ambient temperature. Besides being disposed on the substrate 11, the thermal sensor of this embodiment may also be disposed at any position of the electronic device 10. For example, the thermal sensor may be disposed in the vicinity of the storage 14, so that the ambient temperature detected by the thermal sensor is close to the temperature of the storage 14.

By detecting a pin corresponding to the heating module 18, the detection module 112 implemented through the KBC detects whether the storage 14 has the heating module 18. When the electronic device 10 is started, the detection module 112 detects whether the storage 14 has the heating module 18 according to relevant information written into the RAM 15 or a relevant flag of the heating module 18. Additionally, the detection module 112 implemented through the BIOS may detect whether the storage 14 has the heating module 18 via 0x45 and 0x3F commands. For example, when the detection module 112 receives a return value via the 0x45 and 0x3F commands and the first bit (bit 0) of the return value is "1", it represents that the storage 14 has the heating module 18. Therefore, regardless of whether the storage 14 is a non-removable hard disk or a removable hard disk built in the electronic device 10, the Step S120 can be implemented both.

Then, the comparison module 113 compares the ambient temperature with a temperature threshold (Step S140). The reading module 114 reads storage information to provide the storage information to the storage determination module 115 (Step S150). The storage information corresponds to the type of the storage 14. The storage determination module 115 detects and determines the type of the storage 14 according to the storage information (Step S160). Furthermore, in the boot determining method of the electronic device, the execution order of Step S130, Step S140, Step S150 and Step S160 is not limited.

Figure 3:
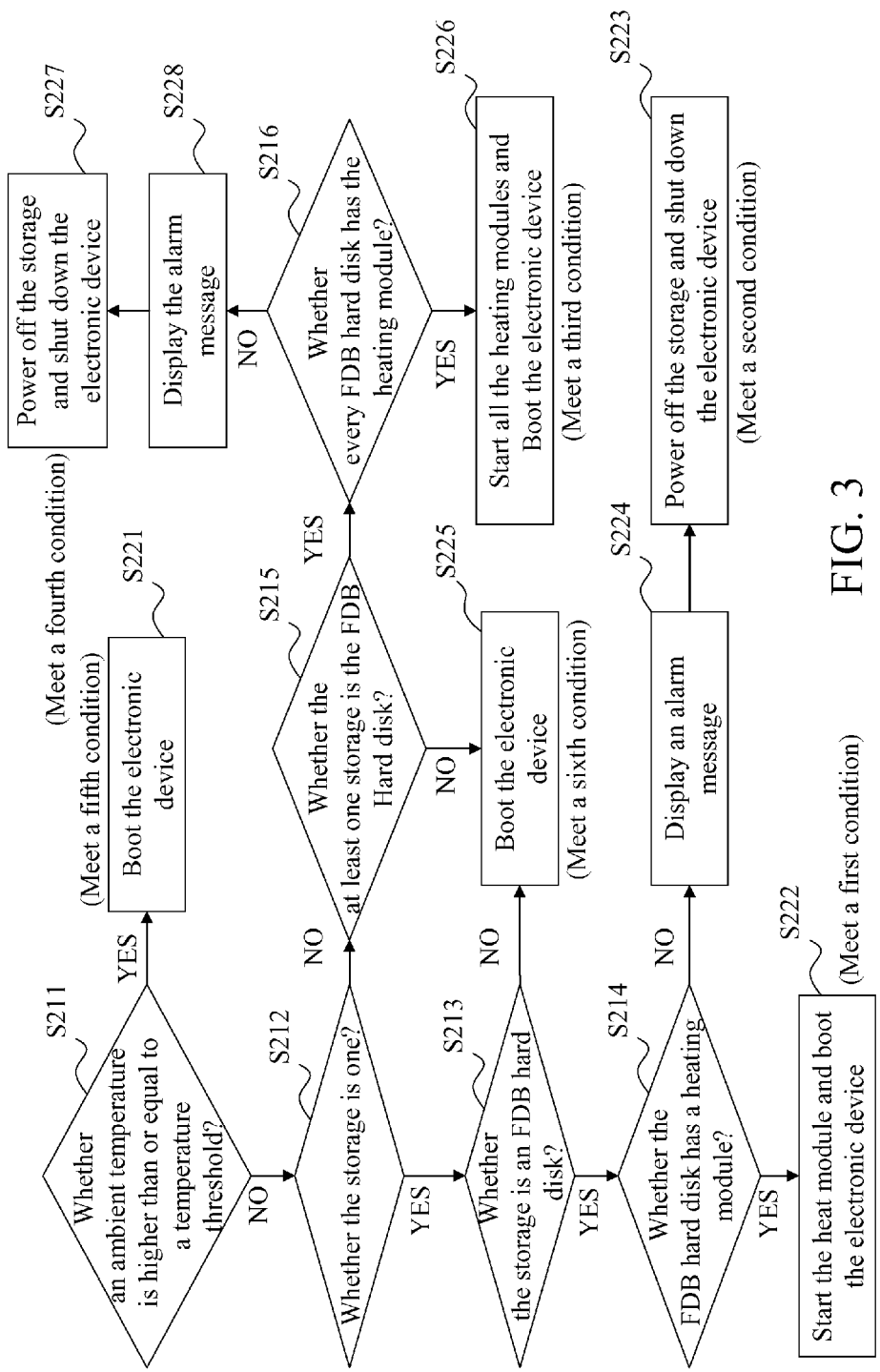
FIG. 3 is a flow chart of step 170 to an embodiment.

A determining condition comprises the type of the storage 14, whether the ambient temperature is lower than the temperature threshold and whether the storage 14 has the heating module 18. After obtaining various required information, the boot determination module 116 determines whether to boot the electronic device 10 according to the determining condition (Step S170). The detailed implementation of Step S170 is described below. FIG. 3 is a flow chart of step 170 to an embodiment. Please refer to FIG. 1 and FIG. 3.

After the ambient temperature is read, the comparison module 113 determines whether the ambient temperature is lower than a preset temperature threshold (Step S211), to determine whether the electronic device 10 is at low temperature. The temperature threshold may be 5 degrees Celsius or zero degrees Celsius. When the ambient temperature is higher than or equal to the temperature threshold, it represents that the FDB hard disk will operate safely. Therefore, the boot determination module 116 can directly boot the electronic device 10 (S221).

The reading module 114 reads the storage information about the type of the storage 14, and then the storage determination module 115 detects and determines the type of the storage 14 according to the storage information. In an embodiment, the KBC may first store the detected ambient temperature information and the result of whether the storage 14 has the heating module 18 into a register 151 of the RAM 15. Then, the BIOS reads the ambient temperature information and executes Step S140.

According to another embodiment, the KBC may also determine whether the ambient temperature is lower than the temperature threshold, and then write the determination result into the RAM 15. For example, when the ambient temperature is lower than the temperature threshold, the KBC sets a most significant bit (MSB) of the RAM address as the flag and sets the effective value of the flag to be "1". The BIOS may read the value of the flag through a low pin count bus (LPC bus), and then execute the subsequent determination step.

When the ambient temperature is lower than the temperature threshold, the boot determination module 116 may first determine whether the number of the storage 14 is one (Step S212). In the embodiment of FIG. 1, the electronic device 10 only has one storage 14. Then, the boot determination module 116 determines whether the storage 14 is the FDB hard disk (Step S213). If the storage 14 is the FDB hard disk, the boot determination module 116 determines whether the FDB hard disk has the heating module 18 (Step S214).

When the type of the storage 14 is the FDB hard disk and the storage 14 has the heating module 18, the BIOS with the boot determination module 116 starts the heating module 18 of the storage 14, and then boots the electronic device 10 (Step S222). On the contrary, when the storage 14 is the FDB hard disk without the heating module 18, the storage 14 is powered off and the electronic device 10 is shut down, to avoid damage of the FDB hard disk without the heating module 18 in the low-temperature environment.

When the ambient temperature is lower than the temperature threshold and the storage 14 is the FDB hard disk without the heating module 18, an alarm message may be displayed in the POST screen of the display 17 for the user (Step S224). After several seconds, the storage 14 is powered off and the electronic device 10 is shut down. In order to further warn the user, the KBC may instruct a Light Emitting Diode (LED) of the electronic device 10 to flash red light eight times, and then shut down the electronic device 10.

Additionally, the solid state disk can work normally when the temperature is below zero degrees Celsius. Therefore, when the storage 14 is the solid state disk and is not the FBD hard disk, the electronic device 10 is directly booted (Step S225). In this embodiment, the storage 14 of the solid state disk does not need to have the heating module 18; if the solid state disk has the heating module 18, the heating module 18 does not need to be started.

Figure 4:
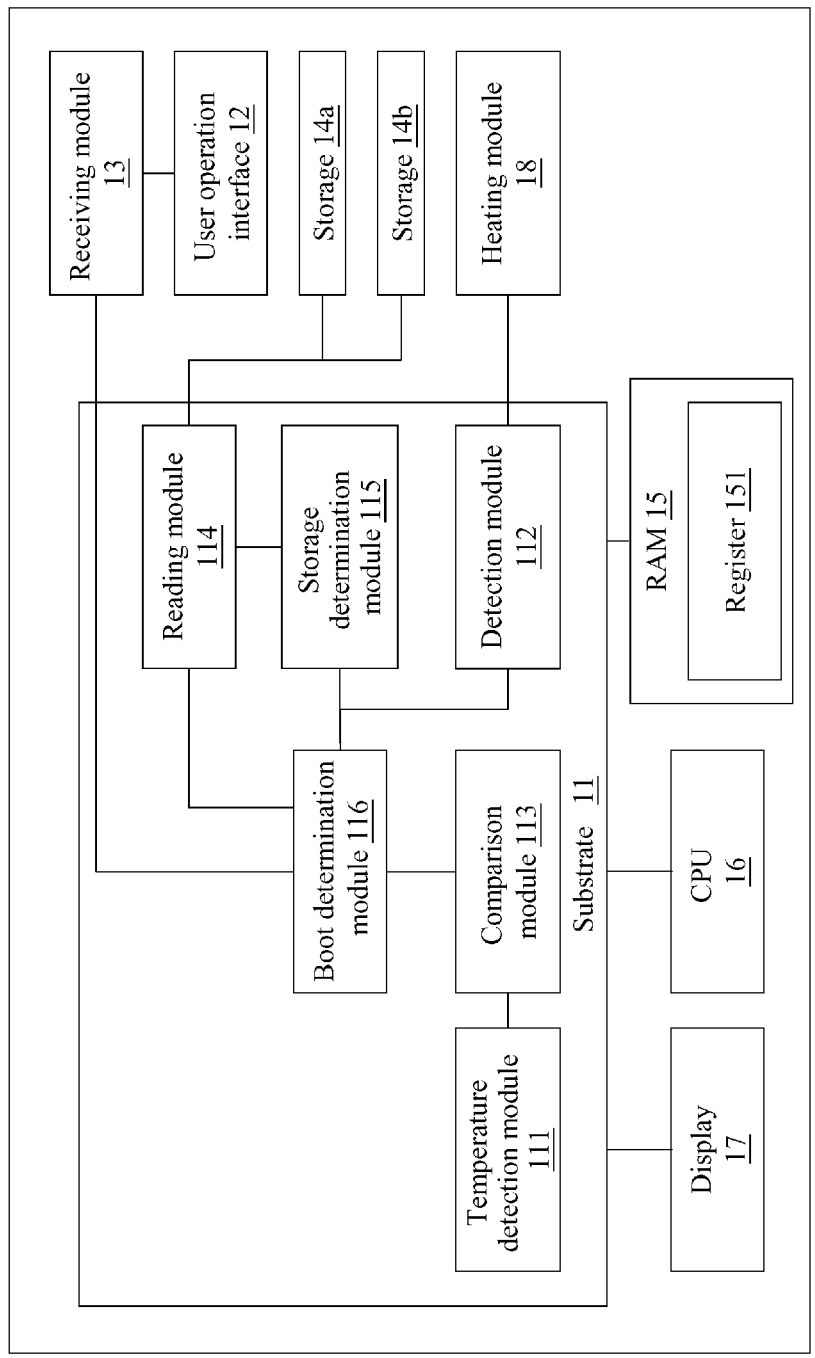
FIG. 4 is an architectural view of the electronic device according to another embodiment.

According to another embodiment of the disclosure, the boot determining method of the electronic device is used to boot the electronic device 10 having multiple storages 14, either. Please refer to FIG. 3 and FIG. 4. FIG. 4 is an architectural view of the electronic device according to another embodiment. In the embodiment of FIG. 3, the electronic device 10 has a storage 14a and a storage 14b. The storage 14a and the storage 14b may both be the FDB hard disks or the solid state disks. Otherwise, one of the storage 14a and storage 14b is the solid state disk, and the other is the FDB hard disk.

Possible situations of the storage 14a and the storage 14b are as shown in the following table:

| Code Number | Storage 14a | Storage 14b |
|---|---|---|
| 1 | FDB hard disk, having the heating module | FDB hard disk, having the heating module |
| 2 | FDB hard disk, having the heating module | FDB hard disk, without heating module |
| 3 | FDB hard disk, having the heating module | Solid state disk, without heating module |
| 4 | FDB hard disk, without heating module | FDB hard disk, having the heating module |
| 5 | FDB hard disk, without heating module | FDB hard disk, without heating module |
| 6 | FDB hard disk, without heating module | Solid state disk, without heating module |
| 7 | Solid state disk, without heating module | FDB hard disk, having the heating module |
| 8 | Solid state disk, without heating module | FDB hard disk, without heating module |
| 9 | Solid state disk, without heating module | Solid state disk, without heating module |

After a power trigger signal is received, the temperature detection module 111 detects the ambient temperature. The detection module 112 detects whether each of the storage 14a and the storage 14b has the heating module 18. Similarly, the detection module 112 implemented through the BIOS detects whether the storage 14a and the storage 14b have the heating module 18 by the 0x45 and 0x3F commands. For example, when the detection module 112 receives a return value via the 0x45 and 0x3F commands and a first bit (bit 0) of the return value is "1", it represents that the storage 14a has the heating module 18. When the detection module 112 receives the return value via the 0x45 and 0x3F commands a second bit (bit 1) of the return value is "1", it represents that the storage 14b has the heating module 18.

The KBC or the BIOS may determine whether the ambient temperature is lower than the temperature threshold (Step S211). When the KBC or the BIOS determines that the electronic device 10 is not at low temperature, the electronic device 10 is booted (Step S221). When the ambient temperature is lower than the temperature threshold and the electronic device 10 has multiple storages 14, the boot determination module 116 determines whether one of the storages 14 is the FDB hard disk (Step S215). When all of the storages 14 are not the FDB hard disks (for example, situation with code number 9 in the table), the electronic device 10 is booted (Step S225). In this embodiment, the storage 14 of the solid state disk does not need to have the heating module 18. If the solid state disk has the heating module 18, the heating module 18 does not need to be started.

When at least one of the storages 14 is the FDB hard disk, the boot determination module 116 determines whether every one of the FDB hard disk has the heating module 18 (Step S216). If the determination result of the boot determination module 116 is that every FDB hard disk has the heating module 18 (for example, situation with code number 1, 3 or 7 in the table), the heating module 18 is started. After that, until the FDB hard disk is heated to a preset temperature, the electronic device 10 is booted (Step S226). On the contrary, when the ambient temperature is lower than the temperature threshold, and the determination result of the boot determination module 116 is that any one of the storages is the FDB hard disk without the heating module 18 (for example, situation with code number 2, 4, 5, 6 or 8 in the table), all the storages 14 are powered off and the electronic device 10 is shut down (Step S227). Otherwise, before all the storages 14 are powered off and the electronic device 10 is shut down, an alarm message is displayed on the display 17 (Step S228), to inform the user. In this embodiment, the content of the alarm message is that the electronic device will be shut down in few seconds.

To sum up all kinds of the conditions, the above-mentioned conditions of Step S170 may comprise a first condition, a second condition, a third condition, a fourth condition, a fifth condition and a sixth condition.

The first condition is as follows: the number of the storage is one, the ambient temperature is lower than the temperature threshold, the type of the storage is the FDB hard disk and the FDB hard disk has the heating module. When the electronic device meets the first condition, the heating module is started and then the electronic device is booted (Step S222).

The second condition is as follows: the number of the storage is one, the ambient temperature is lower than the temperature threshold, the type of the storage is the FDB hard disk and the FDB hard disk is without the heating module. When the electronic device meets the second condition, the storage is power off and the electronic device is shut down (Step S223).

The third condition is as follows: the number of the storages is plural, the ambient temperature is lower than the temperature threshold, the type of the at least one storage is the FDB hard disk and each of the FDB hard disk has the heating module. When the electronic device meets the third condition, all of the heating modules are started and then the electronic device is booted (Step S226).

The fourth condition is as follows: the number of the storages is plural, the ambient temperature is lower than the temperature threshold, the type of the at least one storage is the FDB hard disk and any one of the FDB hard disk is without the heating module. When the electronic device meets the fourth condition, all of the storages are power off and the electronic device is shut down (Step S227).

The fifth condition is as follows: the ambient temperature is higher than or equal to the temperature threshold. When the electronic device meets the fifth condition, the electronic device is booted (Step S221).

The sixth condition is as follows: all the types of the storages are the solid state disk. When the electronic device meets the sixth condition, the electronic device is booted (Step S225).

In the boot determining method of the electronic device, at the POST stage before loading the operating system, the ambient temperature is detected, and the type of the storage and whether the storage having the heating module are detected. Then, it is ensured that the electronic device is booted safely in the circumstances when the storage can work normally. On the contrary, if the electronic device includes the FDB hard disk without heating module, the user may be warned, and the electronic device is forced to be shut down, to avoid damage of the hard disk in the low-temperature environment.

Moreover, it is an automatic detection which detects whether the storage is with or without heating module. Therefore, the boot determining method of the electronic device can be applicable to the removable hard disk.

What is claimed is:

1. A boot determining method of an electronic device, for determining whether to boot the electronic device having at least one storage, the method comprising:
   receiving a start signal;
   detecting an ambient temperature;
   detecting whether the at least one storage has a heating module;
   comparing the ambient temperature with a temperature threshold;
   reading storage information;
   determining type(s) of the at least one storage according to the storage information; and
   determining whether to boot the electronic device after receiving the starting signal as follows:
      when the number of the at least one storage is one, the ambient temperature is lower than the temperature threshold, the type of the storage is Fluid Dynamic Bearing (FDB) hard disk, and the FDB hard disk has the heating module, starting the heating module and then booting the electronic device;
      when the number of the at least one storage is one, the ambient temperature is lower than the temperature threshold, the type of the at least one storage is the FDB hard disk, and the FDB hard disk does not have the heating module, powering off the at least one storage and shutting down the electronic device;
      when the number of the at least one storage is plural, the ambient temperature is lower than the temperature threshold, the type of the at least one storage is FDB hard disk, and each of the at least one FDB hard disk has the heating module, starting each of the at least one heating module and then booting the electronic device;
      when the number of the at least one storage is plural, the ambient temperature is lower than the temperature threshold, the type of the at least one storage is the FDB hard disk, and any of the FDB hard disk does not have the heating module, powering off all the storages and shutting down the electronic device; and
      when the type of all of the at least one storage is solid state disk, booting the electronic device.

2. The boot determining method of the electronic device according to claim 1,
   further comprising a step of displaying an alarm message when it is determined to shut down the electronic device.

3. The boot determining method of the electronic device according to claim 1, wherein the step of determining whether to boot the electronic device after receiving the starting signal further comprises booting the electronic device when the ambient temperature is higher than or equal to the temperature threshold.

4. An electronic device, capable of automatically determining whether to be booted, the electronic device comprising:
   at least one storage;
   a receiving module, for receiving a start signal;
   a temperature detection module, for detecting an ambient temperature;
   a detection module, electrically coupled to the at least one storage, for detecting whether the storage has a heating module;

a comparison module, electrically coupled to the temperature detection module, for comparing the ambient temperature with a temperature threshold;
a reading module, for reading storage information, wherein the storage information corresponds to type(s) of the at least one storage;
a storage determination module, electrically coupled to the reading module, for detecting and determining the type(s) of the at least one storage according to the storage information; and
a boot determination module, electrically coupled to the receiving module, the storage determination module, the comparison module and the detection module, for determining whether to boot the electronic device after receiving the starting signal from the receiving module according to a determining condition, wherein the boot determination module is configured to:
  start the heating module and then boot the electronic device when the number of the at least one storage is one, the ambient temperature is lower than the temperature threshold, the type of the storage is Fluid Dynamic Bearing (FDB) hard disk, and the FDB hard disk has the heating module;
  power off the at least one storage and shut down the electronic device when the number of the at least one storage is one, the ambient temperature is lower than the temperature threshold, the type of the at least one storage is the FDB hard disk, and the FDB hard disk does not have the heating module;
  start each of the at least one heating module and then boot the electronic device when the number of the at least one storage is plural, the ambient temperature is lower than the temperature threshold, the type of the at least one storage is FDB hard disk, and each of the at least one FDB hard disk has the heating module;
  power off all the storages and shut down the electronic device when the number of the at least one storage is plural, the ambient temperature is lower than the temperature threshold, the type of the at least one storage is the FDB hard disk, and any of the FDB hard disk does not have the heating module; and
  boot the electronic device when the type of all of the at least one storage is solid state disk.

5. The electronic device according to claim 4, wherein the reading module, the storage determination module and the boot determination module are integrated into a basic input/output system (BIOS) of the electronic device.

6. The electronic device according to claim 4, wherein when the storage determination module is further configured to display an alarm message when it is determined to shut down the electronic device.

7. The electronic device according to claim 4, wherein the temperature detection module and the detection module are integrated into a keyboard controller (KBC) of the electronic device.

8. The electronic device according to claim 7, wherein the KBC stores the detected ambient temperature and the result of whether the at least one storage has the heating module into a random access memory (RAM) of the electronic device, for a BIOS of the electronic device to read.

9. The electronic device according to claim 7, wherein the temperature detection module is a thermal sensor, the thermal sensor is disposed on a substrate of the electronic device, and the KBC reads the thermal sensor through an inter integrated circuits bus (I2C bus), to detect the ambient temperature.

* * * * *